Feb. 5, 1957 R. T. STEVENS 2,780,332
AUTOMATICALLY RELEASABLE TORQUE TRANSMITTING APPARATUS
Filed Jan. 3, 1955 3 Sheets-Sheet 1
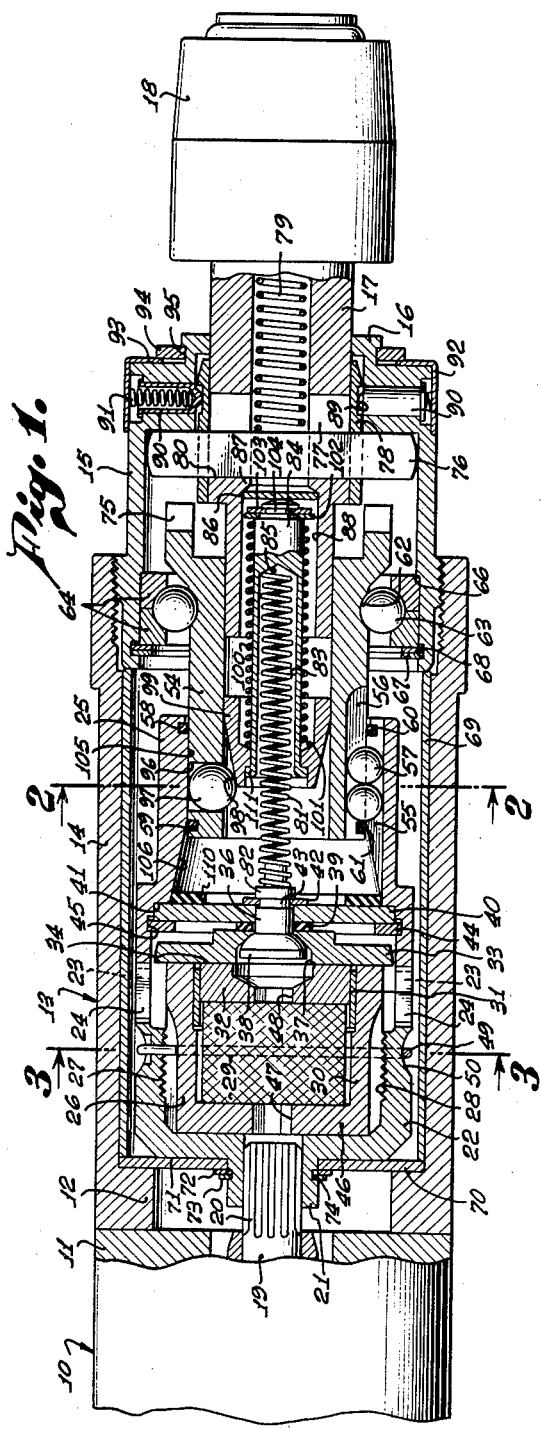
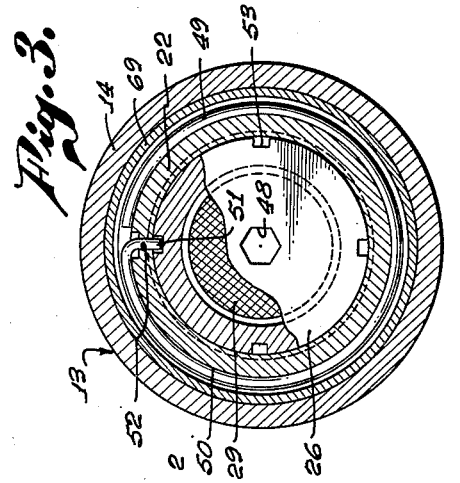
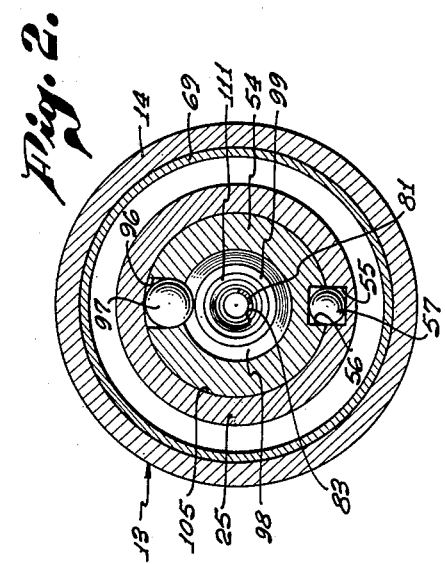
INVENTOR.
ROBERT T. STEVENS,
BY
Bernard Kriegel
ATTORNEY.

Feb. 5, 1957  R. T. STEVENS  2,780,332
AUTOMATICALLY RELEASABLE TORQUE TRANSMITTING APPARATUS
Filed Jan. 3, 1955  3 Sheets-Sheet 2
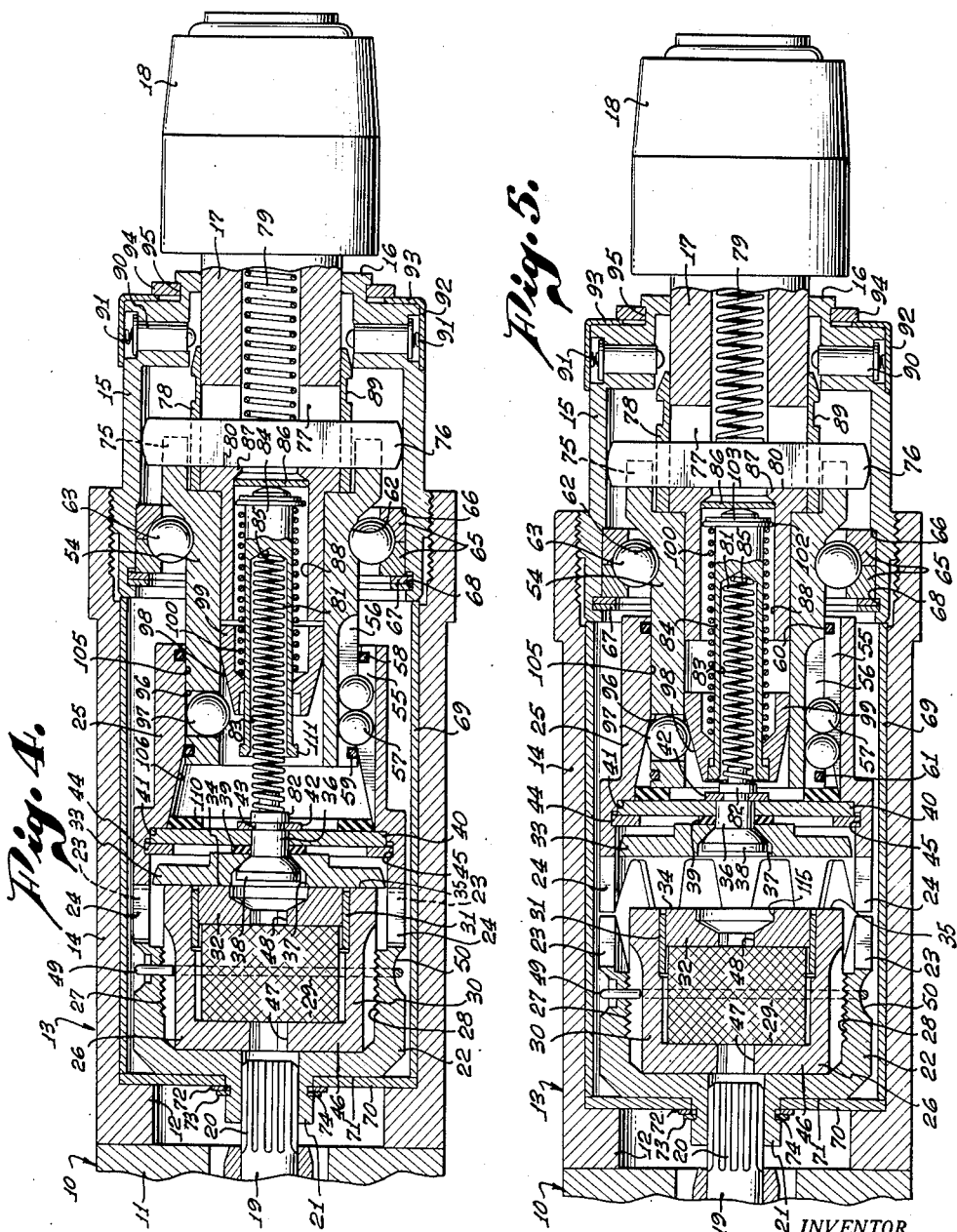
INVENTOR.
Robert T. Stevens,
BY
Bernard Kriegel
ATTORNEY.

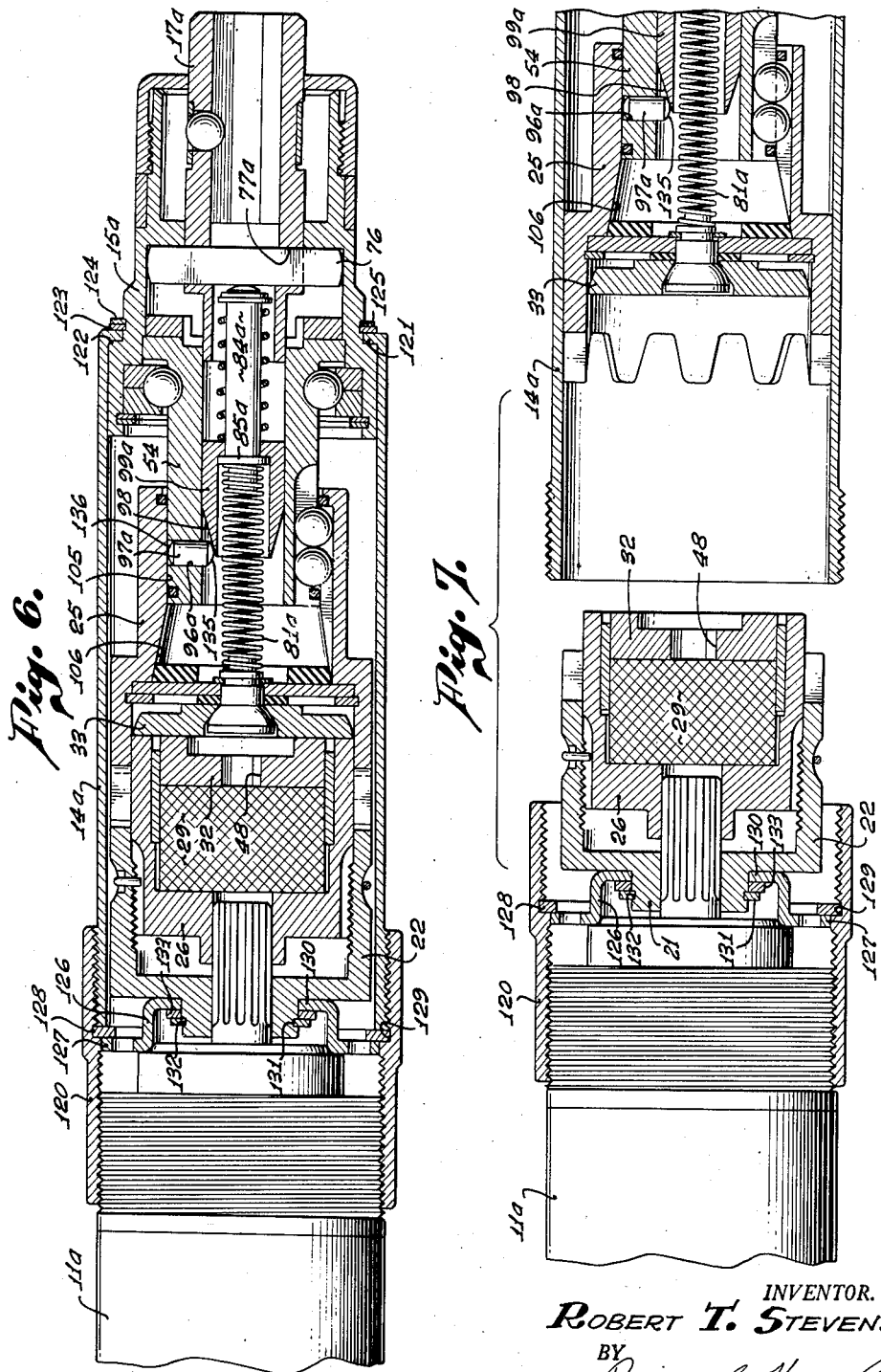

United States Patent Office 2,780,332
Patented Feb. 5, 1957

2,780,332
AUTOMATICALLY RELEASABLE TORQUE TRANSMITTING APPARATUS

Robert T. Stevens, Altadena, Calif., assignor to Adele M. Stevens, Los Angeles, Calif.

Application January 3, 1955, Serial No. 479,462

16 Claims. (Cl. 192—56)

The present invention relates to apparatus for automatically effecting a disconnection between a driving and driven member when the torque transmitted therebetween reaches a predetermined maximum value.

Automatically releasable torque transmitting apparatus may embody a clutch mechanism which is disconnected when the torque transmitted reaches a preselected maximum value. A latch device may hold the clutch mechanism in disconnected condition until it is desired to reconnect the clutch elements. Heretofore, the latch device, at times, did not perform its required purpose of holding the clutch disengaged, resulting in undesirable premature reengagement of the clutch.

An object of the present invention is to provide an automatically releasable torque transmitting apparatus embodying a clutch mechanism that becomes disconnected when the torque transmitted reaches a predetermined value, in which an improved releasable latch mechanism comes into play automatically to hold the clutch fully disengaged, insuring against its premature reengagement.

Another object of the invention is to provide an automatically operable latch mechanism capable of holding a torque releasable clutch fully disengaged, despite the fact that the amount of relative separating movement between the driving and driven clutch members may vary during a multiplicity of clutch disengaging operations.

A further object of the invention is to provide an automatically operable latch mechanism for holding a torque releasable clutch fully disengaged, the latch mechanism embodying one or more detent or holding elements of ample size, but of reduced space requirements, in the apparatus.

One type of automatically releasable torque transmitting apparatus utilizes a rotatable magnet and armature arrangement for holding the driving and driven clutch teeth coengaged. If variations in the torque are desired at which the clutch teeth disengage from each other, the position of the magnet with respect to its rotatable supporting member is adjusted, which change in position correspondingly alters the position of the armature and the clutch member to which it is connected, resulting in a change in the initial point of contact between the clutch teeth. A specific apparatus of the aforenoted character is described and claimed in the application of Henry T. M. Rice and Robert T. Stevens, Serial No. 265,513, filed January 8, 1952, for "Adjustable Releasable Torque Transmitting Apparatus."

Another object of the present invention is to maximize the force of attraction between the magnet and the armature, to increase the force holding the torque releasable driving and driven clutch teeth coengaged.

Still a further object of the invention is to provide an automatically releasable torque transmitting apparatus embodying a magnetic arrangement for holding the clutch teeth coengaged, in which assurance is had that the magnet, or its pole-piece, and the armature will make proper and most efficient contact with each other.

Yet another object of the invention is to provide an improved lock for holding the magnet in the desired position of adjustment with respect to its rotatable supporting member, to insure release of the clutch members from each other at the required adjusted torque.

A further object of the invention is to provide an automatic torque release clutch apparatus, in which the clutch teeth are held coengaged by a coacting permanent magnet and armature rotatable with the apparatus, in which the armature and magnet are easily separated from each other when the apparatus is to be partially disassembled, as when the position of the magnet is to be adjusted to vary the torque at which clutch disconnection will occur automatically.

This invention possesses many other advantages, and has other objects which may be made more clearly apparent from a consideration of several forms in which it may be embodied. Such forms are shown in the drawings accompanying and forming part of the present specification. These forms will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a longitudinal section, with parts shown in elevation, through an apparatus embodying the invention, disclosing the primary clutch engaged and the secondary clutch disengaged;

Fig. 2 is a cross-section taken along the line 2—2 on Fig. 1;

Fig. 3 is a cross-section taken along the line 3—3 on Fig. 1;

Fig. 4 is a longitudinal section similar to Fig. 1, disclosing the parts in the position which they occupy when the primary clutch and secondary clutch are both engaged;

Fig. 5 is a view similar to Fig. 1, disclosing the primary clutch disengaged and the secondary clutch engaged;

Fig. 6 is a view similar to Fig. 1, of a modified form of the invention; and

Fig. 7 is an exploded view of the apparatus disclosed in Fig. 6, in partially disassembled condition.

The apparatus shown in the drawings is designed primarily as a releasable torque transmitting device for rotating threaded fastening elements (not shown), such as nuts, bolts and screws, to a predetermined degree of tightness. It is to be understood, however, that the apparatus disclosed has other uses, wherever it is desirable to effect the automatic disconnection between driving and driven members when the torque transmitted therebetween reaches a preselected or predetermined value.

In the form of apparatus disclosed in Figs. 1 to 5, inclusive, a motor 10, which may be of the electric or pneumatic type, has its casing 11 suitably secured to the rearward inwardly directed end flange 12 of the housing or casing 13 of the releasable torque transmitting apparatus, as through use of screws or bolts (not shown) extending between the motor casing 11 and the end flange 12. The housing 13 is made in two main sections, including the rearward section 14 embodying the inwardly directed end flange 12, the forward portion of this rearward section being threadedly secured to a forward housing section 15 having an end wall 16 through which the spindle or ultimately driven member 17 of the apparatus extends. This spindle may carry a wrench socket 18, or the like, for connection to a nut that is to be tightened against a piece of work.

The motor 10 includes a drive shaft 19 provided with splines 20 received within a companion splined hub 21 of a rotatable cup-shaped housing or driving clutch member 22, which has axially extending clutch teeth 23 at its peripheral portions. The axial teeth 23 are adapted to releasably engage companion teeth 24 extending axially from a driven clutch member 25 that may move longitudinally of the housing 13 to effect a complete disconnection between the driven clutch teeth and the driving clutch teeth. The teeth 23, 24 on the driving and driven members 22, 25, are generally convex in shape, in order to enable their initial points of contact to be varied when the clutch is engaged, thereby altering the tangent to the point of engagement between the clutch teeth, which will determine the torque at which the clutch teeth will be disengaged, by virtue of the camming action therebetween. The specific shape of the clutch teeth, by itself, forms no part of the present invention, and is described and claimed in the above-identified patent application.

The clutch elements of the primary clutch apparatus are maintained in driving engagement with each other by a magnetic device. The cup-shaped driving member 22 has a cup-shaped permanent magnet holder 26 threadedly and adjustably received therewithin. Thus, the periphery of the magnet holder 26 is provided with external threads 27 meshing with internal threads 28 in the driving member. A permanent magnet 29 is received within the magnet holder, being shielded from the side wall 30 of the latter by a suitable non-magnetic shield 31, such as a brass bushing, interposed between the side wall and the magnet. This shield 31 also is interposed between a pole-piece 32, engaging the magnet 29, and the side wall, to provide a proper air gap between the side wall 30, on the one hand, and the magnet 29 and pole-piece 32 on the other hand. The magnet 29, pole-piece 32, and bushing 31 may be secured within the magnet holder 26 by the use of a suitable adhesive material, such as a synthetic resin.

The primary driven clutch member 25 has a transversely extending armature 33 secured thereto adapted to engage the forward face 34 of the pole-piece 32 and the forward end 34 of the magnet holder, to hold the driven clutch teeth 24 in engagement with the driving clutch teeth 23. The armature 33 is secured to the driven member 25 by a central stud 36 passing through a central bore 37 in the armature, this stud having a generally spherical head 38 adapted to engage the central portion of the armature. The stud 36 itself passes through a rubber washer 39 engaging the forward end of the armature and the rear face of a coupling plate 40, the outer portion of which abuts a rearwardly directed shoulder 41 on the driven member. A split, contractible retainer ring 42 is disposed within a peripheral groove 43 in the forward portion of the stud, this ring engaging the forward face of the coupling plate 40 and coacting with the spherical stud head 38 to clamp the armature 33, rubber washer 39 and coupling plate 40 to one another. The rubber washer 39 and the spherical head 38 permit universal movement of the armature 33 on the stud 36, so that the armature can adjust itself properly to make flat surface contact with the face 34 of the pole-piece 32 and the end 35 of the magnet holder 26.

The coupling plate 40 is secured against axial movement relative to the driven member by a split expansible retainer ring 44 received within an internal groove 45 in the driven member 25 and bearing against the rear face of the coupling plate. Thus, the coupling plate 40 is prevented from moving axially in both directions with respect to the driven clutch member 25 by the retainer ring 44 and by the inwardly directed shoulder 41 on the driven member.

The attractive force of the magnetic device on the armature 33 tends to hold the driven clutch teeth 24 in appropriate engagement with the driving clutch teeth 23. When the torque transmitted reaches a predetermined value, then the camming action between the driving and driven clutch teeth will exert an axial force to overcome the holding force of the magnet device and will shift the driven member 25 in a forward direction away from the driving member 22, to completely disengage the clutch teeth 23, 24 from one another, thereby interrupting the drive between the driving member and the driven member.

For the purpose of varying the torque transmitted between the driving and the driven members, at which primary clutch disengagement will occur, the initial points of contact between each driving clutch tooth 23 and driven clutch tooth 24 is varied. The variation is accomplished by threading the magnetic device 22, 26, 29, 32 in the proper direction within the driving member 22 itself. To facilitate such threading action, the base 46 of the magnet holder 26 may have an axial non-circular or hexagonal socket 47 therein, or a similar socket 48 may be provided in the central portion of the pole-piece 32. A suitable wrench is inserted in either socket, as when the driving clutch member 22 has been removed from the drive shaft 19 of the motor 10, or the armature 33 has been dismantled from its position adjacent the pole-piece 32, to rotate the cup-shaped holder 26 within the driving member 22, which will shift the cup-shaped holder axially of the driving member and axially of the apparatus itself. Inasmuch as the armature 33 engages the pole-piece 32 and the forward end 35 of the magnet holder 26, the axial position of the magnetic device within the driving member will determine the initial point of engagement of the driven clutch teeth 24 with the driving clutch teeth 23. As described in the above-identified patent application, the movement of the magnet device, armature and driven member 25, in a forward direction will cause an initial point of contact between the teeth to occur at a particular tangent angle, which will effect clutch disengagement at a lesser torque than when the magnetic device is threaded toward the rear of the driving member 22, to allow deeper engagement between the driving and driven clutch teeth 23, 24.

Once the proper appropriate adjustment has been made in the position of the magnet holder 26 and the magnetic elements 29, 32 contained therein within the driving member 22, these parts are locked to one another, to maintain the desired adjusted position. The specific form of lock shown in the drawings includes a contractile spring-like lock ring 49 disposed within a peripheral groove 50 in the driving member 22. This lock ring has an inwardly directed projection 51 extending through a radial hole 52 in the driving member for reception within one of a plurality of longitudinally extending peripheral slots or grooves 53 in the magnet holder 26. When an adjustment of the magnet holder 26 within the driving member 22 is to be made, the inward projection 51 need merely be pulled out of longitudinal groove 53 in which it is received and out of the hole 52 in the driving member, whereupon the magnet holder 26 is rotated within the housing 22 in the proper direction and to the desired extent. Following the rotation of the magnet holder in the driving holder, to secure the predetermined torque at which the clutch teeth will disengage from one another, the projection 51 is permitted to reenter the radial hole 52 and one of the longitudinal grooves 53 that have been aligned therewith. It is evident that the spring 49, being inherently contractible, will retain the projection 51 in such position, thereby preventing relative rotation between the magnet holder 26 and the driving member 22.

The driven clutch member 25 of the primary clutch is connected to the driving member 54 of a secondary clutch through a splined connection. This splined connection includes opposed longitudinal grooves 55, 56 in the driven member 25 and the driving member 54 of the secondary clutch, containing one or more balls 57 that serve as rollable spline teeth to connect the driven member 25 and driving member 54 together while permitting the driven member to slide axially upon the driving member 54. The balls 57 are retained in position within the grooves 55, 5 by split snap rings 58, 59 disposed in peripheral grooves 60, 61 in the driven member 25 and also in the driving member 54 of the secondary clutch.

The driving member 54 of the secondary clutch is rotatably supported in the forward housing section 15, being prevented from moving axially therein. This is accomplished by providing a raceway 62 in the periphery of the driving clutch member on which a plurality of ball bearing elements 63 may roll, these elements also being rollable within the opposed outer races 64 of the anti-friction bearing, which are held against axial movement in the forward housing section 15 by having one of the outer races 65 engaging a shoulder 66 in the housing section 15 and the other race 65 engaging one or more expansible split retaining rings 67 received within an internal groove 68 in the housing section and engaging the rear face of the race 65. By virtue of the bearing construction disclosed, the driving member 54 of the secondary clutch is rotatably supported in the forward housing section 15 and is prevented from moving axially with respect thereto.

The rear end of the forward housing section 15 engages the end of a retainer sleeve 69 within the rear housing section 14 that abuts against a washer 70 bearing against the rear end flange 12 of the housing section 14. This washer encompasses the hub 21 of the driving member 22 of the primary clutch, engaging the rear face 71 of the driving member to prevent rearward axial movement of the latter. The rear face of the washer 70 engages an anti-friction washer 72 encircling the hub of the driving member, the latter, in turn, engaging a contractible split snap ring 73 received within a peripheral groove 74 in the hub 21.

It is apparent that the threading of the forward housing section 15 within the rear housing section 14 to the fullest extent will clamp the retainer sleeve 69 against the washer 70, in order to rotatably secure the driving clutch mechanism 22, 26, and the parts 29, 32 contained therein, against axial movement with respect to the housing 13 and the driven clutch parts.

The forward end of the secondary driving member 54 has axially extending driving clutch teeth 75 engageable with a transverse pin 76, preferably rectangular or square in cross-section, extending slidably through a transverse slot 77 provided in the axially movable spindle or driven member 17 of the secondary clutch, that projects outwardly through the end wall 16 of the forward housing section 15 and carries the wrench socket 18, or other desired tool. The clutch pin 76 projects in opposite directions through a guide and latch sleeve 78 slidable on the spindle 17, this guide and latch sleeve preventing tilting or rocking of the pin 76 in the spindle.

The guide and latch sleeve 78 and the driven clutch pin 76 are urged normally in a rearward direction, to tend to hold the pin in engagement with the secondary clutch driving teeth 75 by a helical spring 79 disposed in the spindle and bearing upon the pin 76. When the spindle 17 is urged rearwardly in the mechanism, the rearward force is transmitted through the spring 79 to the pin 76, urging the latter toward engagement with the primary clutch teeth 75 and tending to maintain such engagement. When the pin is fully engaged with the clutch teeth, the rearward end 80 of the spindle slot 77 may be spaced away from the pin 76, to prevent the spindle from interfering with full engagement of the pin 76 with the teeth 75 under the influence of the spring 79.

The spindle 17 is urged in the opposite direction, to disconnect the pin 76 from the secondary clutch teeth 75 by a disengaging spring 81, the rearward end of which encompasses the stud 36 and bears upon a spring seat or shoulder 82 provided on the latter. The spring disengaging spring, itself, is contained within a bore 83 of an inner spindle member 84, bearing against the base 85 of the bore to urge the inner spindle member in a forward direction, causing its end to engage a transverse disc 86, which, in turn, engages the base portion 87 of a bore 88 formed in the driven member 17 itself. Thus, the helical spring 81 acts through the inner spindle member 84 and the disc 86 to urge the driven member 17 in an outward direction. It also urges the armature 33 toward a position of engagement with the pole-piece 32 and the forward end 35 of the magnet holder 26, and the driven clutch member 25 into clutching engagement with the driving clutch member 22.

The forward movement of the spindle 17 will cause the rear end 80 of the spindle slot 77 to engage the pin 76 to carry it, together with the guide sleeve 78, in a forward direction, until the pin 76 is completely out of engagement with the secondary clutch driving teeth 75. When this occurs, a peripheral groove 89 in the guide sleeve is disposed opposite one or more detents 90 that are slidable in the forward housing section 15, each detent device including a helical spring 91 disposed within the detent 90 and urging it toward the groove 89, the outer portion of the spring 91 engaging a retaining sleeve 92 disposed around the housing section 15 and having a flange 93 secured to the housing section by a contractible split snap ring 94 received within a peripheral groove 95 in the housing section. When the guide sleeve groove 89 is disposed opposite the detent 90, the spring 91 will force the detent partially into the groove, to hold the sleeve 78 and the clutch pin 76 in a clutch releasing or disconnected position.

When the driven member 25 of the primary clutch is urged in a forward direction, upon a predetermined torque being transmitted therethrough, which is sufficient to overcome the holding force of the magnet 29, it is held in this forward position by a latch device with the clutch teeth 23, 24 fully disengaged. The driving member 54 of the secondary clutch has one or a plurality of transverse holes 96 therein in which a ball detent element 97 is mounted. This ball is urged in an outward direction by the rearwardly tapering or converging surface 98 of a latch sleeve 99 surrounding the inner spindle member 84 and slidable with respect thereto. This latch sleeve 99 is urged in a rearward direction by a helical compression spring 100 encompassing the spindle member 84, its rearward end bearing upon an inwardly directed shoulder 101 on the latch sleeve 99 and its forward end upon a spring seat or washer 102 secured to the spindle member 84 by a contractile, split retainer ring 103 received within a peripheral groove 104 in the spindle member.

When the primary clutch is engaged, the spring 100 is bearing upon the latch sleeve 99 to urge the ball 97 in an outward direction. However, the ball is ineffective to accomplish any latching function at this time, inasmuch as it is then engaging the inner cylindrical surface 105 of the primary driven clutch member 25. However, upon forward movement of the driven member 25, as a result of the predetermined torque being transmitted therethrough and the clutch teeth 23, 24 being disengaged, a rearwardly divergent surface 106 in the driven member is disposed opposite the latch ball 97, which then allows the sleeve 99 to be shifted rearwardly by its actuating spring 100 to force the ball 97 laterally outward and into engagement with the divergent surface 106. Any tendency for the driven member 25 to be reclutched to the driving member 22 under the influence of the clutch reengaging spring 81 is resisted by the fact that the detent ball 97 is engaging the tapered surface 98 of the latch sleeve 99, and the angle of taper of the surfaces 106, 98 is such that the ball 97 cannot force the sleeve 99 in a forward releasing direction against the force of the spring 101, which urges and holds the latch sleeve in a rearward or holding direction.

Because of the tapered surface 106 on the driven member 25, it is unnecessary for the driven member to be shifted to its full extent in a forward direction before the latch ball 97 becomes effective to prevent inadvertent rearward shifting of the driven member 25 and reengagement of the primary clutch teeth 23, 24 with one another. The continuity of the tapered surfaces 106, 98 on the driven clutch member and on the latch sleeve 99 is such that reagrdless of the extent of rearward movement of the driven member 25 on the driving member 54 of the secondary clutch, the ball 97 can engage any portion of the tapered surfaces and prevent rearward or return movement of the driven clutch member 25. Thus, the extent of disengaging movement of the driven member 25 from the driving member 22 may vary, the ball 97 holding the driven clutch member 25 in the forward position to which it has been shifted by the camming action of the clutch teeth 23, 24. Of course, the cylindrical surface 105 is of sufficient extent, so that the ball 97 engages such surface over the entire range of adjustment of the magnet device 26, 29, 32 within the driving clutch member 22, the ball 97 engaging the tapered surface 106 to hold the driven clutch member 25 out of engagement with the driving clutch member 22 only upon movement of the driven clutch member in a forward and clutch releasing direction, as a result of the preselected torque being transmitted through the primary clutch. To prevent the coupling plate 40 from striking the rearward end of the member 54, when the driven member 25 is shifted forwardly to clutch disengaging position, a rubber washer or bumper 110 may be secured between the plate 40 and driven member 25.

So long as the secondary clutch 75, 76 is engaged, the driven member 25 is held in its released position. Such engagement is maintained with the apparatus disclosed by the exertion of an endwise force on the spindle 17, as when it is applied against a threaded fastening element. When the endwise force on the spindle is removed, the spring 81 shifts the inner spindle member 84 and spindle 17 forwardly to a position in which the guide sleeve 78 and secondary clutch pin 76 are held in the forward position by the detent 90 entering the sleeve groove 89, which holds the pin 76 out of engagement with the teeth 75 of the secondary clutch driving member 54. During such forward motion of the spindle 17 under the influence of the spring, a flange 111 at the outer end of the inner spindle member 84 engages the shoulder 101 of the latch sleeve 99, carrying the latter in a forward direction to a position in which its smaller diameter end is disposed opposite the latch ball 97, allowing the ball to move inwardly of the driving member 54 of the secondary clutch. When this occurs, the reengaging spring 81 can shift the armature device 33 and the primary driven clutch member 25 in a rearward direction, reengaging the armature 33 with the magnet device 32, 26, the divergent surface 106 on the driven member forcing the latch ball 97 inwardly to its initial retracted position entirely within the confines of the periphery of the driving member of the secondary clutch, allowing the inner cylindrical portion 105 of the primary driven clutch member 25 to slide over the ball 97, and the clutch teeth 23, 24 to reengage one another.

Despite the reengagement of the primary clutch, no rotation is being imparted to the outer spindle 17, since the secondary clutch is still disengaged. Upon the application of an endwise force in the rearward direction on this spindle, its spring 79 will force the sleeve 78 from under the detent 90, the spring 79 shifting the clutch pin 76 and sleeve 78 rearwardly to a position in which the pin 76 is again engaged with the driving teeth 75 of the secondary clutch.

With the apparatus disclosed, it is a simple matter to partially disassemble the primary clutch portion of the apparatus, for the purpose of effecting an adjustment in the torque at which disengagement of the primary clutch will occur. All that is required is to unscrew the forward housing section 15 from the rearward housing section 14, which will allow all of the apparatus within the rearward housing section to be removed in a forward direction therefrom, the primary clutch remaining engaged by virtue of the attractive force of the magnet device 29, 32, 26 on the armature 33, and the hub 21 of the driving member 22 sliding off the splined portion 20 of the motor drive shaft 19. When the apparatus has been thus removed from the housing 14, the sleeve 69 and forward housing section 15 need merely be pulled in opposite directions with sufficient force to overcome the attracting force of the magnet device on the armature, the endwise movement of the housing section 15 being transmitted through the ball bearing elements 63 to the driving member 54 of the secondary clutch, and from the latter through the retaining spring 59, through the balls 57 and other retaining spring 58 to the primary driven clutch member 25 and the armature 33. The entire secondary clutch and driven member portions of the primary clutch are thus removed as a unit from the driving portions 22, 70, etc. of the primary clutch and the magnet device 26, 29, 32 contained therein, the sleeve 69 then being moved off the driving clutch member 22 to furnish access to the contractile lock spring 49. The inward projection 51 of this lock spring is now moved outwardly from the longitudinal groove 53 in the magnet holder 26, and the latter and the magnet device contained therein rotated in the proper direction within the driving clutch member 22 by inserting a suitable wrench in the hexagonal socket 47, 48 in either the base 46 of the magnet holder 26 or the pole-piece 32. When the magnet device has been readjusted in the driving clutch member 22, the projection 51 on the contractile spring is allowed to reenter one of the longitudinal grooves 53 in the magnet holder 26, which will insure the retention of the magnet device in its appropriate adjusted position.

The sleeve 69 is then slipped over the driving clutch member 22 once again and the driven portion of the primary clutch device and the secondary clutch mechanism, as a sub-assembly, reinserted in the sleeve 69 until the armature 33 again engages the magnet device and the clutch teeth 23, 24 are coengaged. This entire assembly may now be moved back into the rear housing portion 14, to position the hub 21 of the driving member 22 over the splined portion 20 of the motor drive shaft 19, the forward housing section 15 being threaded into the rear housing section 14 to the fullest extent, as determined by the clamping of the rear washer 70 against the shoulder 12 of the rear housing section.

As was stated above, the armature 33 is universally mounted on the stud 36, which will insure that it can accommodate itself to the surface 34 of the pole-piece 32 and the end 35 of the magnet holder 26. To maximize the force of attraction between the armature 33, on the one hand, and the magnet holder 26 and the pole-piece 32, on the other hand, the central portion 115 of the pole-piece 32 is recessed, to provide an annular surface 34 of contact with the armature 33, which is correspondingly recessed to accommodate the spherical head 38 of the coupling stud or pin 36. The recessing of the hole-piece is such that the area of its annular forward face 34 contactable with the armature 33 is substantially equal to the annular area of the end face 35 of the magnet holder 26. By substantially equalizing these areas, a maximum pull of the pole-piece 32 and the housing 26 on the armature 33 is secured. The magnetic circuit passes from the permanent magnet 29, through the pole-piece 32, to the armature 33, and from the armature to the end 35 of the magnet holder 26. From the end of the magnet holder, the magnetic lines of force pass through the wall 30 of the magnet holder to the base 46 of the latter, and from the base back to the permanent magnet 29. There is very little leakage of flux through the air space and the non-magnetic bushing 31 around the periphery of the permanent magnet 29 and pole-piece 32, and the surrounding wall 30 of the holder 26.

In the form of invention illustrated in Figs. 6 and 7, the separation between the armature 33 and driven clutch member 25, on the one hand, and the driving clutch member 22 and magnet device 26, 29, 32 carried thereby, on the other hand, is facilitated. The housing 14a enclosing the clutch apparatus has its rearward end threaded into a coupling sleeve 120 which is, in turn, threaded into the housing 11a of the motor. The forward portion 121 of the housing section 14a has an inwardly directed end flange that engages a shoulder 122 on the forward housing section, being held thereagainst by a washer 123 and a contractile retainer ring 124 engaging the washer and fitting within a peripheral groove 125 in the forward housing section 15a.

The driving member 22 of the primary clutch and the magnet device carried thereby are prevented from endwise movement by a holding spider 126 having an outwardly directed flange 127 held against the end of the motor casing 11a by an expansible split retainer ring 128 engaging the forward face of the flange 127 and received within an internal groove 129 in the coupling sleeve and bearing against the forward face of this flange. The holding spider 126 has an inwardly directed flange 130 at its forward portion engaging the rear face of the driving member 22, being held thereagainst by a contractile split retainer ring 131 received within a groove 132 in the hub 21 of the driving member and bearing against a washer 133 which, in turn, bears against the internal flange.

When it is desired to adjust the position of the magnet device 26, 29, 32 within the driving clutch member 22, it is only necessary to unscrew the housing 14a from the coupling sleeve 120. The holding spider 126 prevents axial movement of the driving clutch member 22 and the magnet device carried thereby, the unscrewing motion of the housing 14a carrying it forwardly and causing corresponding forward movement of the secondary clutch mechanism, the latch mechanism, the driven clutch member 25 of the primary clutch and the armature 33 with it. The mechanical advantage afforded by the threaded connection assures the easy overcoming of the attractive force of the magnet device 29, 32, 26 on the armature 33 and the complete separation of the driven clutch member 25 and armature 33 from the driving member 22 and magnet device. A complete unthreading of the housing 14a will allow the latter to be moved completely off the driving clutch member 22 and the magnet device, exposing the non-circular hexagonal socket 48 in the pole-piece 32 for the insertion of a suitable wrench thereinto, in order to turn the entire magnet device 26, 32, 29 within the driving clutch member 22 in the proper direction, after, of course, the lock spring projection 51 has been removed from the groove 53 in the magnet holder 26 in which it was received.

Following adjustment of the magnet device in the driving clutch member and the reinsertion of the lock spring projection 51 in the longitudinal groove 53 of the magnet holder 26, it is only necessary to rethread the housing section 14a into the coupling sleeve 120 to its fullest extent, the primary clutch becoming reengaged and being held in the engaged position by the magnetic attraction force of the magnet device 26, 32, 29 on the armature 33.

The primary and secondary clutch device specifically disclosed in Figs. 6 and 7 is essentially the same as the other form of apparatus. However, there are some slight differences in structure. Thus, the inner spindle member 84a is not made hollow, to receive the primary clutch reengaging spring 81a. Instead, the forward portion of the reengaging spring bears against a spring seat 85a on the inner spindle member 84a, the forward portion of this inner spindle member, in turn, engaging the transverse secondary clutch pin 76, which is mounted in opposed holes 77a in the outer spindle member 17a. The detent mechanism for holding the secondary clutch disengaged need not be used in the specific form of the invention shown in Figs. 6 and 7.

The latch device for holding the driven clutch member 25 disengaged from the driving clutch member 22 and the armature 33 disengaged from the magnet device 26, 29, 32 operates in essentially the same manner as described in connection with the other form of the invention. However, instead of using a latch ball, a radially slidable, latching pin 97a is used, this pin being slidable within a transverse or radial hole 96a in the driving member 54 of the secondary clutch. The pin has an inner spherical portion 135 engageable with the tapered surface 98 of the latch sleeve 99a, and an outer spherical portion 136 engageable with the inner cylindrical wall 105 of the driven clutch member 25, as well as with its divergent tapered wall or surface 106. The radially slidable pin 97a functions in practically the same manner as the spherical ball or detent 97 of the other form of the invention. It provides the same spherical surface engagement with the tapered surfaces 106, 98, which is desirable. However, it reduces the space required in the apparatus, inasmuch as the diameter of the pin 97a can be made substantially less than its length which enables the driving clutch member 54 of the secondary clutch to be made shorter than is possible through the use of ball type of detent 97. The maximum distance required between the tapered surface 98 of the latch sleeve 99a and the inner surface 106 of the primary driven clutch member 25 determines the diameter of the ball 97, which requires the use of much longer transverse slot or hole 96 through the secondary driving clutch member 54.

The inventor claims:

1. In torque transmitting apparatus: driving and driven members; coengaging clutch elements on said members effecting a rotatable driving connection between said members, said elements comprising cam means responsive to the torque transmitted through said members and tending to shift said elements axially from each other to disengaged position; axially movable means engageable and rotatable with one of said members to hold said elements in driving relation to each other, said elements tending to shift said holding means axially to release said elements from such driving relation; permanent magnet means rotatable with and threadedly secured to the other of said members and exerting a constant axially directed magnetic force on said holding means in opposition to the force exerted on said holding means by said elements while torque is being transmitted through said elements; means on said permanent magnet means to receive a tool for rotating and axially moving said permanent magnet means with respect to said other of said members; and releasable lock means for securing said permanent magnet means to said other of said members.

2. In torque transmitting apparatus: driving and driven members; coengaging clutch elements on said members effecting a rotatable driving connection between said members, said elements comprising cam means responsive to the torque transmitted through said members and tending to shift said elements axially from each other to disengaged position; axially movable means engageable and rotatable with one of said members to hold said elements in driving relation to each other, said elements tending to shift said holding means axially to release said elements from such driving relation; permanent magnet means rotatable with and threadedly secured to the other of said members and exerting a constant axially directed magnetic force on said holding means in opposition to the force exerted on said holding means by said elements while torque is being transmitted through said elements; said permanent magnet means having a central non-circular socket to receive a tool for rotating and axially moving said permanent magnet means with respect to said other of said members; and releasable lock means for securing said permanent magnet means to said other of said members.

3. In torque transmitting apparatus: driving and driven members; coengaging clutch elements on said members effecting a rotatable driving connection between said members, said elements comprising cam means responsive to the torque transmitted through said members and tending to shift said elements axially from each other to disengaged position; permanent magnet means rotatable with and threadedly secured to said driving member; armature means rotatable with and connected to said driven member and engageable with said permanent magnet means to hold said clutch elements in engagement in opposition to the separating force exerted by said elements while torque is being transmitted through said elements; said permanent magnet means having a central non-circular socket to receive a tool for rotating and axially moving said permanent magnet means with respect to said driving member; and releasable lock means for securing said permanent magnet means to said driving member.

4. In torque transmitting apparatus: driving and driven members; coengaging clutch elements on said members effecting a rotatable driving connection between said members, said elements comprising cam means responsive to the torque transmitted through said members and tending to shift said elements axially from each other to disengaged position; permanent magnet means rotatable with and threadedly secured within said driving member; armature means rotatable with and connected to said driven member and engageable with said permanent magnet means to hold said clutch elements in engagement in opposition to the separating force exerted by said elements while torque is being transmitted through said elements; means on said permanent magnet means to receive a tool for rotating and axially moving said permanent magnet means with respect to said driving member; said permanent magnet means having a plurality of peripheral recesses; and a contractible lock ring encompassing said driving member and having a projection passing through said driving member and into one of said recesses to prevent threading movement of said permanent magnet means in said driving member.

5. In torque transmitting apparatus: driving and driven members; coengaging clutch elements on said members effecting a rotatable driving connection between said members, said elements comprising cam means responsive to the torque transmitted through said members and tending to shift said elements axially from each other to disengaged position; permanent magnet means rotatable with said driving member; armature means rotatable with and connected to said driven member and engageable with said permanent magnet means to hold said clutch elements in engagement in opposition to the separating force exerted by said elements while torque is being transmitted through said elements; said armature means including an armature engageable with said permanent magnet means, and a joint supporting said armature to allow it to move universally and engage said permanent magnet means.

6. In torque transmitting apparatus: driving and driven members; coengaging clutch elements to said members effecting a rotatable driving connection between said members, said elements comprising cam means responsive to the torque transmitted through said members and tending to shift said elements axially from each other to disengaged position; permanent magnet means rotatable with said driving member; armature means rotatable with and connected to said driven member and engageable with said permanent magnet means to hold said clutch elements in engagement in opposition to the separating force exerted by said elements while torque is being transmitted through said elements; said armature means including an armature engageable with said permanent magnet means, and a member passing through said armature and having a spherical head on which said armature can move universally.

7. In torque transmitting apparatus: driving and driven members; coengaging clutch elements on said members effecting a rotatable driving connection between said members, said elements comprising cam means responsive to the torque transmitted through said members and tending to shift said elements axially from each other to disengaged position; permanent magnet means rotatable with one of said members; armature means rotatable with and connected to the other of said members and engageable with said permanent magnet means to hold said clutch elements in engagement with each other in opposition to the separating force exerted by said elements while torque is being transmitted through said elements; said permanent magnet means comprising a magnet holder having an end face opposite said armature means, a permanent magnet in said holder, a pole-piece in said holder engaging said magnet and having an end face opposite said armature means, said end faces having substantially equal areas.

8. In torque transmitting apparatus: driving and driven members; coengaging clutch elements on said members effecting a rotatable driving connection between said members, said elements comprising cam means responsive to the torque transmitted through said members and tending to shift said elements axially from each other to disengaged position; permanent magnet means rotatable with one of said members; armature means rotatable with and connected to the other of said members and engageable with said permanent magnet means to hold said clutch elements in engagement with each other in opposition to the separating force exerted by said elements while torque is being transmitted through said elements; said permanent magnet means comprising a cup-shaped magnet holder having a base, a side wall extending from said base and terminating in an end face opposite said armature means; a permanent magnet in said holder engaging said base and insulated from said side wall; a pole-piece in said holder engaging said magnet and insulated from said side wall, said pole-piece having an end face opposite said armature means, said end faces having substantially equal areas.

9. In torque transmitting apparatus: driving and driven members; coengaging clutch elements on said members effecting a rotatable driving connection between said members, said elements comprising cam means responsive to the torque transmitted through said members and tending to shift said elements axially from each other to disengaged position; permanent magnet means rotatable with said driving member; armature means rotatable with and connected to said driven member and engageable with said permanent magnet means to hold said clutch elements in engagement with each other in opposition to the separating force exerted by said elements while torque is being transmitted through said elements; said permanent magnet means comprising a cup-shaped magnet holder having a base, a side wall extending from said base and terminating in an end face opposite said armature means; a permanent magnet in said holder engaging said base and insulated from said side wall; a pole-piece in said holder engaging said magnet and insulated from said side wall, said pole-piece having an end face opposite said armature means, said end faces having substantially equal areas.

10. In torque transmitting apparatus: a first housing section; a second housing section detachably secured to said first housing section; driving and driven members in said housing sections; coengaging clutch elements on said members effecting a rotatable driving connection between said members, said elements comprising cam means responsive to the torque transmitted through said members and tending to shift said elements axially from each other to disengaged position; axially movable means engageable and rotatable with one of said members to hold said elements in driving relation to each other, said elements tending to shift said holding means axially to release said elements from such driving relation; permanent magnet means rotatable with the other of said members and exerting a constant axially directed magnetic force on said holding means in opposition to the force exerted on said holding means by said elements while torque is being transmitted through said elements; means in said first housing section for preventing disassembly of said holding means and said one of said members from said first housing section; means in said second housing section for preventing disassembly of said permanent magnet means and said other of said members from said second housing section; whereby detachment of said first and second housing sections from each other will separate said holding means and said one of said members from said permanent magnet means and said other of said members, respectively.

11. In torque transmitting apparatus: a first housing section; a second housing section detachably secured to said first housing section; driving and driven members in said housing sections; coengaging clutch elements on said members effecting a rotatable driving connection between said members, said elements comprising cam means responsive to the torque transmitted through said members and tending to shift said elements axially from each other to disengaged position; axially movable means engageable and rotatable with one of said members to hold said elements in driving relation to each other, said elements tending to shift said holding means axially to release said elements from such driving relation; permanent magnet means rotatable with and threadedly secured to the other of said members and exerting a constant axially directed magnetic force on said holding means in opposition to the force exerted on said holding means by said elements while torque is being transmitted through said elements; means on said permanent magnet means to receive a tool for rotating and axially moving said permanent magnet means with respect to said other of said members; releasable lock means for securing said permanent magnet means to said other of said members; means in said first housing section for preventing disassembly of said holding means and said one of said members from said first housing section; means in said second housing section for preventing disassembly of said permanent magnet means, said other of said members, tool receiving means, and releasable lock means from said second housing section; whereby detachment of said first and second housing sections from each other will separate said holding means and said one of said members from said permanent magnet means, said other of said members, tool receiving means, and releasable lock means to render said tool receiving means and releasable lock means accessible for effecting adjustment of said permanent magnet means with respect to said other of said members.

12. In torque transmitting apparatus: a first housing section; a second housing section threadedly and detachably secured to said first housing section; driving and driven members in said housing sections; coengaging clutch elements on said members effecting a rotatable driving connection between said members, said elements comprising cam means responsive to the torque transmitted through said members and tending to shift said elements axially from each other to disengaged position; permanent magnet means rotatable with and threadedly secured to said driving member; armature means rotatable with and connected to said driven member and engageable with said permanent magnet means to hold said clutch elements in engagement in opposition to the separating force exerted by said elements while torque is being transmitted through said elements; said permanent magnet means having a central non-circular socket to receive a tool for rotating and axially moving said permanent magnet means with respect to said driving member; releasable lock means for securing said permanent magnet means to said driving member; means in said first housing section for preventing disassembly of said holding means and driven member from said first housing section; means in said second housing section for preventing disassembly of said permanent magnet means and said driving member from said second housing section; whereby unthreading and detachment of said first and second housing sections from each other will separate said holding means and driven member from said permanent magnet means and driving member and expose said lock means for release and said socket for the reception of the tool to adjust said permanent magnet means relative to said driving member.

13. In torque transmitting apparatus: driving and driven members; coengageable axially extending clutch elements on said members effecting a rotatable driving connection between said members and responsive to the torque being transmitted to shift said members axially with respect to each other and release said clutch elements from one another to disrupt such driving connection; driven means rotatable by said driven member; said driven member having a tapered holding surface therein; a detent on said driven means; a holding member having a tapered surface engaging said detent to hold it engaged with said driven member tapered surface and secure said driven member axially away from said driving member to maintain said clutch elements released from one another; and means for shifting said holding member to release said detent from said driven member surface and allow said driven member to move axially to reengage said clutch elements with each other.

14. In torque transmitting apparatus: driving and driven members; coengageable axially extending clutch elements on said members effecting a rotatable driving connection between said members and responsive to the torque being transmitted to shift said members axially with respect to each other and release said clutch elements from one another to disrupt such driving connection; driven means rotatable by said driven member; said driven member having an internal tapered holding surface; a detent on said driven means; a holding member having an external tapered surface engaging said detent to urge it outwardly into engagement with said driven member tapered surface, said external tapered surface engaging said detent while said detent engages said driven member tapered surface to hold said driven member axially away from said driving member to maintain said clutch elements released from one another; and means for shifting said holding member to allow inward movement of said detent from said driven member surface and allow said driven member to move axially to reengage said clutch elements with each other.

15. In torque transmitting apparatus: driving and driven members; coengageable axially extending clutch elements on said members effecting a rotatable driving connection between said members and responsive to the torque being transmitted to shift said members axially with respect to each other and release said clutch elements from one another to disrupt such driving connection; driven means rotatable by said driven member; said driven member having a tapered holding surface therein; a generally cylindrical detent on said driven means having inner and outer generally spherical ends; a holding member having a tapered surface engaging one of said spherical ends to hold the other spherical end of said detent engaged with said driven member tapered surface to hold said driven member axially away from said driving member to maintain said clutch elements released from one another; and means for shifting said holding member to release said detent from said driven member surface and allow said driven member to move axially to reengage said clutch elements with each other.

16. In torque transmitting apparatus: driving and driven members; coengageable axially extending clutch elements on said members effecting a rotatable driving connection between said members and responsive to the torque being transmitted to shift said members axially with respect to each other and release said clutch elements from one another to disrupt such driving connections; driven means rotatable by said driven member;

said driven member having an internal tapered holding surface; a generally cylindrical detent slidable laterally on said driven means and having inner and outer generally spherical ends; a holding member having an external tapered surface engaging said inner spherical end of said detent to hold said outer spherical surface of said detent engaged with said driven member tapered surface to hold said driven member axially away from said driving member to maintain said clutch elements released from one another; and means for shifting said holding member to allow inward retraction of said detent from said driven member surface and allow said driven member to move axially to reengage said clutch elements with each other.

References Cited in the file of this patent

FOREIGN PATENTS 705,948     Great Britain  ----------- Mar. 24, 1954